United States Patent
Kanai et al.

(10) Patent No.: US 12,423,986 B2
(45) Date of Patent: Sep. 23, 2025

(54) IMAGE CAPTURING APPARATUS AND VEHICLE

(71) Applicant: CANON KABUSHIKI KAISHA, Tokyo (JP)

(72) Inventors: Yuki Kanai, Tokyo (JP); Jun Kawata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 18/389,898

(22) Filed: Dec. 20, 2023

(65) Prior Publication Data

US 2024/0221383 A1 Jul. 4, 2024

(30) Foreign Application Priority Data

Dec. 28, 2022 (JP) ................... 2022-211106

(51) Int. Cl.
  *G06V 20/56* (2022.01)
  *G06T 5/80* (2024.01)

(52) U.S. Cl.
  CPC ............ *G06V 20/56* (2022.01); *G06T 5/80* (2024.01); *G06T 2207/20132* (2013.01)

(58) Field of Classification Search
  None
  See application file for complete search history.

(56) References Cited

U.S. PATENT DOCUMENTS

| | | | | |
|---|---|---|---|---|
| 11,800,244 B1* | 10/2023 | Vaziri | ............... | H04N 23/90 |
| 2017/0001565 A1* | 1/2017 | Nakano | ............... | G06V 20/586 |
| 2017/0310952 A1* | 10/2017 | Adomat | ............... | H04N 23/73 |
| 2017/0359497 A1* | 12/2017 | Mandelli | ............... | H04N 25/77 |
| 2019/0026864 A1* | 1/2019 | Chen | ............... | G06T 3/4053 |
| 2019/0299865 A1* | 10/2019 | Bergman | ............... | F16M 13/022 |
| 2021/0088774 A1* | 3/2021 | Yu | ............... | H04N 21/4728 |
| 2022/0182561 A1* | 6/2022 | Kaufman | ............... | H04N 25/41 |
| 2023/0333189 A1* | 10/2023 | Panagis | ............... | G01R 33/50 |

(Continued)

FOREIGN PATENT DOCUMENTS

| | | | | |
|---|---|---|---|---|
| CN | 106232428 A | * | 12/2016 | ............ G06V 20/56 |
| CN | 112265502 A | * | 1/2021 | ............ B60R 1/00 |

(Continued)

OTHER PUBLICATIONS

Notice of Reasons for Refusal issued by the Japanese Patent Office on Jan. 7, 2025 in corresponding JP Patent Application No. 2022-211106, with English translation.

(Continued)

*Primary Examiner* — Ricky Chin
(74) *Attorney, Agent, or Firm* — Carter, DeLuca & Farrell LLP

(57) ABSTRACT

An image capturing apparatus capable of capturing essential parts in high resolution comprises an image capturing unit configured to include an optical system that forms a low-resolution region on the central side of a light-receiving surface and a high-resolution region on the peripheral side of the light-receiving surface, wherein the image capturing unit is arranged on a vehicle so that an image of a lower side and forward-rearward direction of the vehicle is formed in the high-resolution region of the light-receiving surface of the image capturing unit by the optical system.

11 Claims, 15 Drawing Sheets

(56) References Cited

U.S. PATENT DOCUMENTS

| | | | | |
|---|---|---|---|---|
| 2024/0177492 A1* | 5/2024 | Sugimoto | ............. | H04N 7/181 |
| 2024/0217439 A1* | 7/2024 | Horikawa | ............. | H04N 7/181 |
| 2024/0221383 A1* | 7/2024 | Kanai | ................... | G06V 20/56 |
| 2025/0074306 A1* | 3/2025 | Ikari | ...................... | B60R 1/002 |

FOREIGN PATENT DOCUMENTS

| | | | | |
|---|---|---|---|---|
| CN | 114872631 A * | 8/2022 | ........... | H04N 23/698 |
| CN | 119313819 A * | 1/2025 | ............ | G06T 17/00 |
| EP | 3404911 A1 * | 11/2018 | ............ | H04N 25/41 |
| EP | 3922597 A2 * | 12/2021 | ........... | G02B 3/0068 |
| JP | 2006-060460 A | 3/2006 | | |
| JP | 2011-193485 A | 9/2011 | | |
| JP | 2016-168877 A | 9/2016 | | |
| JP | 2022064843 A * | 4/2022 | ............... | H04N 7/18 |
| JP | 7064451 B2 * | 5/2022 | ........... | H04N 23/951 |
| JP | 2023057644 A * | 4/2023 | ............... | B60R 1/26 |
| KR | 102278748 B1 * | 7/2021 | ............. | H04N 21/81 |
| KR | 20240156172 A * | 10/2024 | ............. | G02B 1/041 |
| WO | WO-2016055060 A1 * | 4/2016 | ............. | H04N 23/73 |
| WO | 2018/016305 A1 | 1/2018 | | |
| WO | WO-2020189817 A1 * | 9/2020 | ........... | H04N 19/119 |
| WO | WO-2020235385 A1 * | 11/2020 | ............ | B60W 40/12 |
| WO | WO-2022190314 A1 * | 9/2022 | ....... | G08G 1/096791 |
| WO | WO-2022203175 A1 * | 9/2022 | ........... | H04N 19/176 |

OTHER PUBLICATIONS

Notice of Reasons for Refusal issued by the Japanese Patent Office on Jul. 16, 2024 in corresponding JP Patent Application No. 2022-211106, with English translation.

* cited by examiner

IMAGE CAPTURING APPARATUS AND VEHICLE

BACKGROUND OF THE INVENTION

Field of the Invention

The present invention relates to an image capturing apparatus for capturing the periphery of a vehicle, and to a vehicle and the like.

Description of the Related Art

Conventionally, a vehicle such as an automobile is provided with a door mirror (side mirror) for confirming the left and right rearward of the vehicle. In contrast, in recent years, to improve visibility in adverse weather conditions and to reduce blind spots and the like, electronic mirror technology has been known which replaces traditional door mirrors consisting of a mirror with a system that captures images of vehicle surroundings by using an image capturing apparatus, and displays these images on a monitor.

However, with the angle of view of a conventional door mirror, a blind spot can occur in the periphery of the vehicle during a right turn, when passing through narrow streets (passing oncoming vehicles), and parking in narrow spaces and the like, making safety confirmation challenging. In contrast, Japanese Patent Application Laid-Open No. 2016-168877 proposes a solution that involves installing an image capturing apparatus at the left and right door mirror positions of the vehicle that capture images rearward of the vehicle, and an image capturing apparatus for capturing images of the periphery of the vehicle, thereby eliminating blind spots.

However, the configuration disclosed in Japanese Patent Application Laid-Open No. 2016-168877 requires the preparation of an apparatus for capturing images of the periphery of the vehicle and the peripheral portions of the wheels on each of the left and right side surfaces, leading to a problem of increased installation costs. In addition, there is a problem of processing cost because performing alignment correction is required to correct the positional misalignment between videos captured by the image capturing apparatuses located on each of the left and right-side surfaces that capture the surroundings of the vehicle and the peripheral portions of the wheels.

SUMMARY OF THE INVENTION

In an image capturing apparatus comprising an image capturing unit configured to include an optical system that forms a low-resolution region on the central side of a light-receiving surface and that forms a high-resolution region on the peripheral side of the light-receiving surface, wherein the image capturing unit is arranged on a vehicle so that an image of a lower side and forward-rearward direction of the vehicle is formed in the high-resolution region of the light-receiving surface by the optical system.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
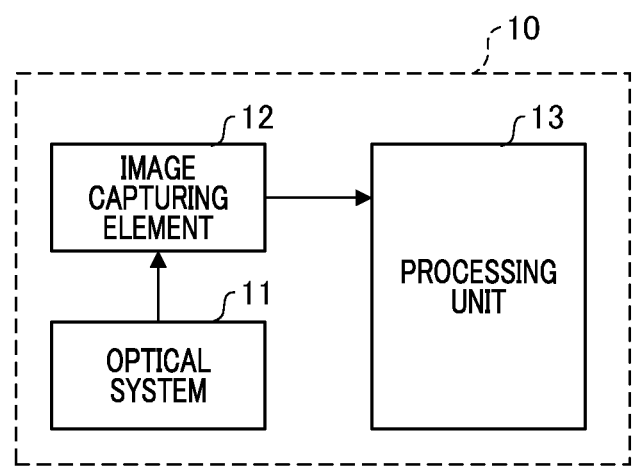
FIG. 1 is a diagram explaining an image capturing apparatus 10 according to a First Embodiment.

FIG. 1 is a diagram explaining an image capturing apparatus 10 according to a First Embodiment of the present invention. The image capturing apparatus 10 of FIG. 1 is installed on a side surface of a vehicle 100 for monitoring the surroundings of the vehicle 100, and forms a image capturing system for performs image capturing of a subject in the surroundings of the vehicle 100. The image capturing apparatus 10 includes an optical system 11, an image capturing element 12, and a processing unit 13.

The optical system 11 includes at least one lens, and forms an image of light incident from the subject on a light-receiving surface (not shown) of the image capturing element 12 serving as an image capturing unit. The image capturing element 12 converts the optical subject image that has been formed by the optical system 11 into an electrical signal, and transmits the electrical signal to the processing unit 13. Details of the optical characteristics of the optical system 11 will be described below.

The processing unit 13 is, for example, a System On Chip (SOC) or Field Programmable Gate Array (FPGA), and the like, and includes a CPU as a computer and a memory as a storage medium. The CPU performs various controls of the entire system by executing a computer program that has been stored in the memory.

In addition, the processing unit 13 develops the video signal acquired from the image capturing apparatus 10, and performs various image processing such as Wide Dynamic Range (WDR) correction, gamma correction, Look Up Table (LUT) processing, distortion correction, cutting out, and the like. It should be noted that the processing unit 13 may be installed within an information processing device at a location distant from the vehicle 100.

Figures 2A, 2B:
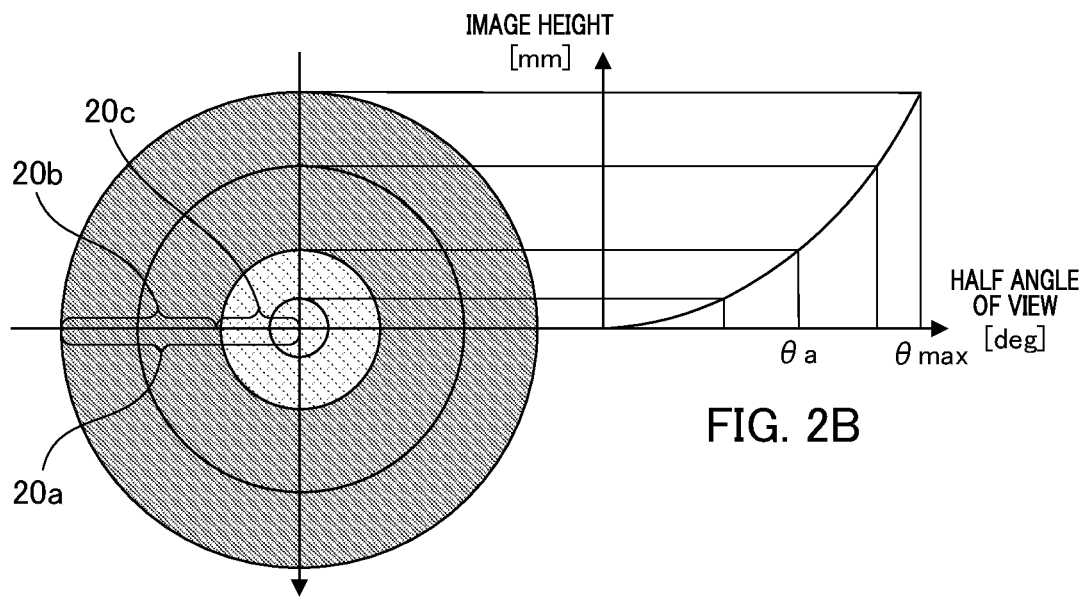
FIGS. 2A and 2B are diagrams for explaining the optical properties of an optical system 11 according to the First Embodiment.

Next, details with respect to the optical properties of the optical system 11 included in the image capturing apparatus 10 will be explained. FIGS. 2A and 2B are diagrams for explaining the optical properties of an optical system 11 according to the First Embodiment, and FIG. 2A is a diagram showing the image height y at each half angle of view on the light-receiving surface of the image capturing element of the optical system 11 in the form of contours.

In addition, FIG. 2B is a diagram illustrating the projection characteristic that represents the relationship between the image forming height y and the half angle of view θ of the optical system 11. In FIG. 2B, the half angle of view θ (the angle formed between the optical axis and the incident light ray) is shown on the horizontal axis, and the image forming height y on the light-receiving surface (image plane) of the image capturing apparatus 10 is shown on the vertical axis.

As shown in the projection characteristic of FIG. 2B, the optical properties of the optical system 11 are configured such that the projection characteristic y(θ) changes in a region with a small half angle of view θ (near the optical axis) and in a region with a large half angle of view θ (regions away from the optical axis). That is, when the resolution is referred to as the amount of increase in image height y per unit of half angle of view θ (that is, the number of pixels per unit angle), the resolution varies depending on the region.

It can be said that this local resolution is represented by a derivative dy(θ)/dθ at the half angle of view θ of the projection characteristic y(θ). That is, it can be said that as the inclination of the projection characteristic y(θ) in FIG. 2B is larger, the resolution is higher. In addition, it can be said that as the distance between the image height y at each of the half angle of view in contour form in FIG. 2A is larger, the resolution is higher.

In the First Embodiment, the region near the center formed on the light-receiving surface of the sensor (wherein the half angle of view θ is less than the predetermined half angle of view θa) is referred to as the "low-resolution region 20c", and the outward region wherein the half angle of view θ is equal to or greater than the predetermined half angle of view θa is referred to as the "high-resolution region 20b".

Furthermore, 20a indicates the total image capturing range (total angle of view). It should be noted that the low-resolution region 20c is a high-distortion region, and the high-resolution region 20b is a low-distortion region. It should be further noted that in the embodiments, the low-resolution region 20c and the high-resolution region 20b of the optical system 11 are configured to be a concentric shape, but they do not have to be a concentric shape and, for example, each region may have a distorted shape.

Furthermore, the centroid of the low-resolution region 20c and the centroid of the high-resolution region 20b may not coincide, and moreover, these centroids may be offset from the central side of the light-receiving surface. In the First Embodiment, the low-resolution region 20c may be formed on the central side of the light-receiving surface of the image capturing unit, and the high-resolution region 20b may be formed on the peripheral side of the light-receiving surface.

It should be noted that, the optical system 11 of the First Embodiment is configured to satisfy the following Equation 1 when the focal distance of the optical system is f, the half angle of view is θ, the image height on the image plane is y, the projection characteristic representing the relationship between the image height y and the half angle of view θ is y(θ), and θmax is the maximum half angle of view of the optical system.

$$0.2 < 2 \times f \times \tan(\theta max/2)/y(\theta max) < 0.92 \quad \text{(Formula 1)}$$

In an optical system with such optical properties, the magnification in the radial direction can be adjusted with respect to the optical axis by adjusting the projection characteristic y(θ). Thereby, because the aspect ratio in the radial direction and the circumferential direction can be controlled with respect to the optical axis, unlike a conventional fisheye lens and the like, it is possible to obtain an image of high resolution with little distortion in a peripheral region while having a wide angle of view.

Figure 3:
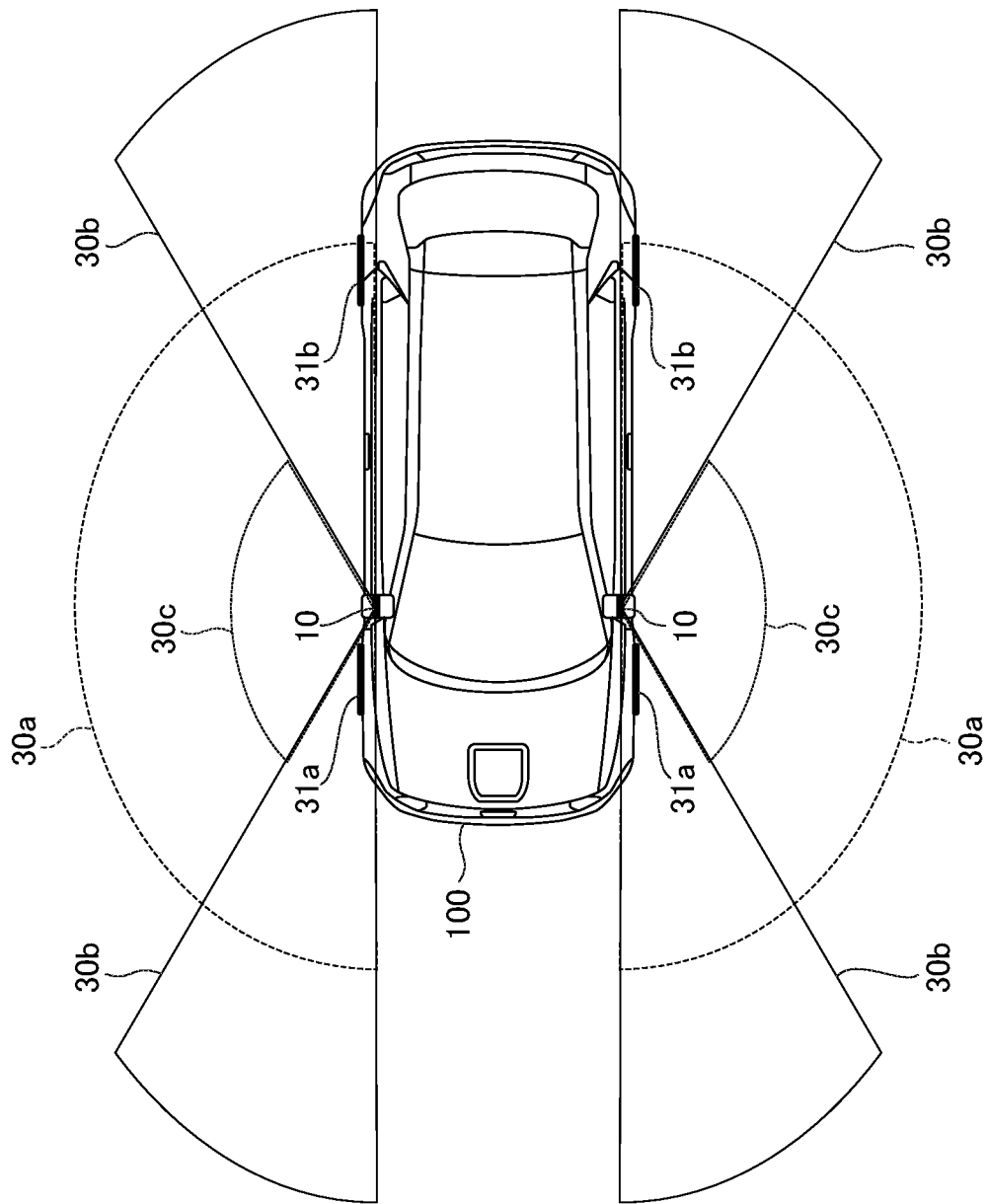
FIG. 3 is a diagram explaining a vehicle and an image capturing range of an image capturing apparatus according to the First Embodiment.
Figure 4A:
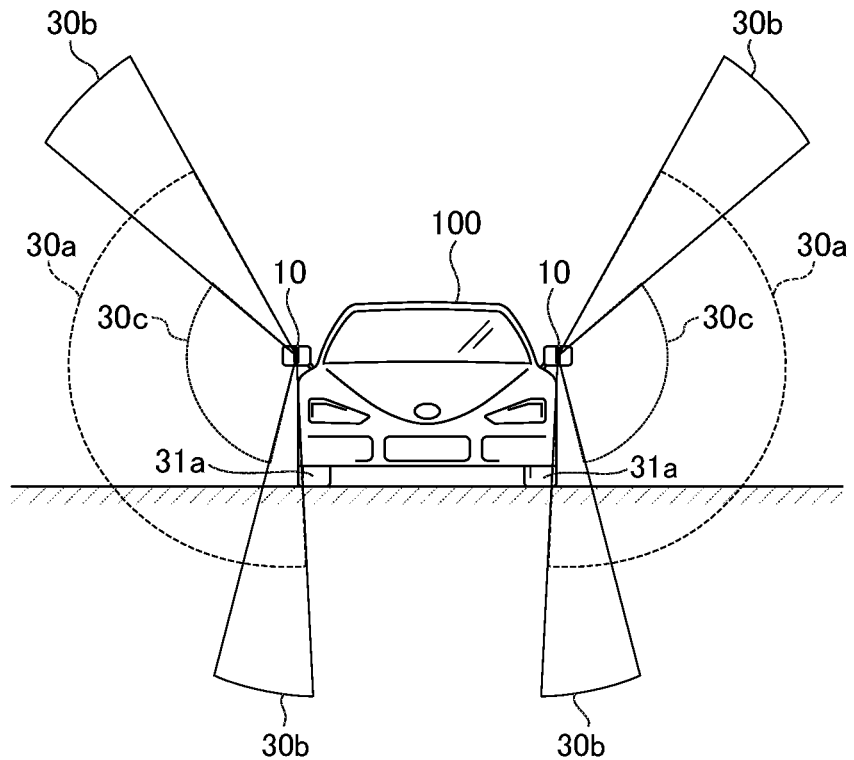
FIG. 4A is a diagram of the vehicle shown in FIG. 3 as viewed from the front.
Figure 4B:
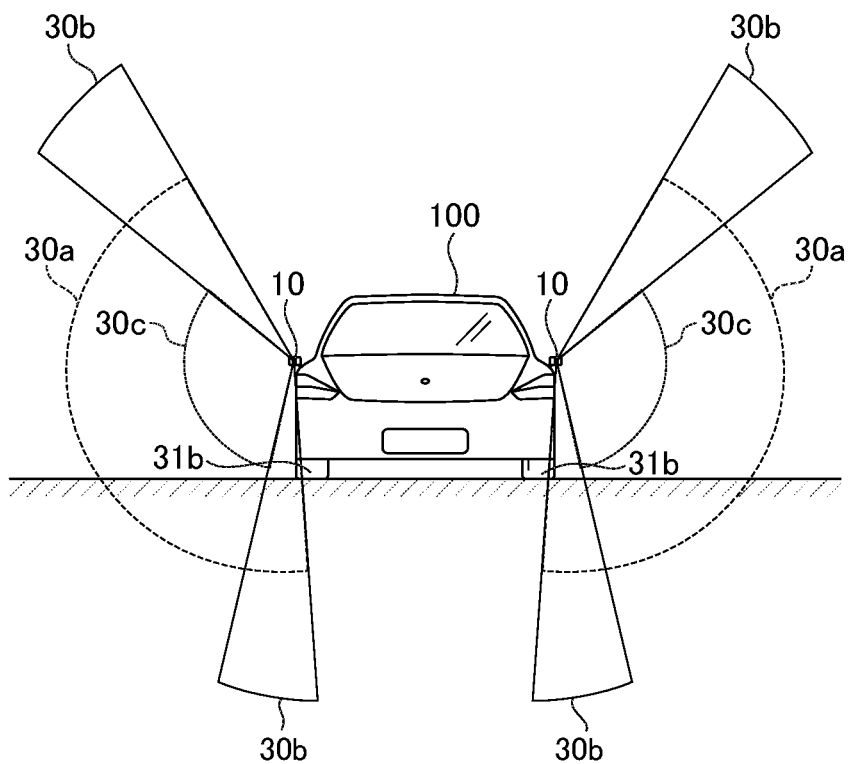
FIG. 4B is a diagram of the vehicle shown in FIG. 3 as viewed from the rear.

FIG. 3 is a diagram explaining an image capturing range of a vehicle (for example, an automobile) and an image capturing apparatus according to the First Embodiment. In addition, FIG. 4A is a diagram of the vehicle 100 shown in FIG. 3 as viewed from the front, and FIG. 4B is a diagram of the vehicle 100 shown in FIG. 3 as viewed from the rear, schematically representing the vertical angle of view of the image capturing apparatus 10. In FIG. 3, the vehicle 100 is viewed from above in an overhead view, and it should be noted that an image capturing apparatus 10 is installed on the right side and the left side of the vehicle.

In FIG. 3 and FIG. 4 (A) and FIG. 4 (B), the total image capturing range 30a schematically represents the horizontal angle of view of the image capturing apparatus 10, and the total image capturing range 30a is arranged so as to include a blind spot portion of the driver in a diagonal forward direction within the capturing range of the image capturing apparatus 10. At this time, the blind spot portion may be captured in either a high-resolution image capturing range 30b or a low-resolution image capturing range 30c.

It should be noted that a high-resolution image capturing range 30b is the range captured in the high-resolution region 20b of the image capturing apparatus 10, and a low-resolution image capturing range 30c is the range captured in the low-resolution region 20c of the image capturing apparatus 10. Furthermore, a total image capturing range 30a corresponds to the total image capturing range (total angle of view) 20a of the image capturing apparatus 10.

Furthermore, as shown in FIG. 3 and FIGS. 4A and 4B, with respect to the periphery of the vehicle, the angle of view of a high-resolution image capturing range 30b of an image capturing apparatus 10 is such that it includes the diagonal forward direction and diagonal rearward direction, as well as the diagonal upward and diagonal downward directions of the vehicle 100. It should be noted that the image capturing apparatus 10 is arranged such that a high-resolution image capturing range 30b includes a tire peripheral portion that includes a front wheel 31a and a rear wheel 31b of the vehicle, as well as the road surface. That is, the optical system 11 is arranged such that images of the front wheels, the rear wheels, and the road surface are formed in the high-resolution regions.

That is, in the First Embodiment, there is one feature in that an image capturing unit provided with an optical system is arranged on a vehicle so as to form an image of a lower side and forward-rearward direction of the vehicle in the high-resolution region of the light-receiving surface of the image capturing unit.

Figure 5:
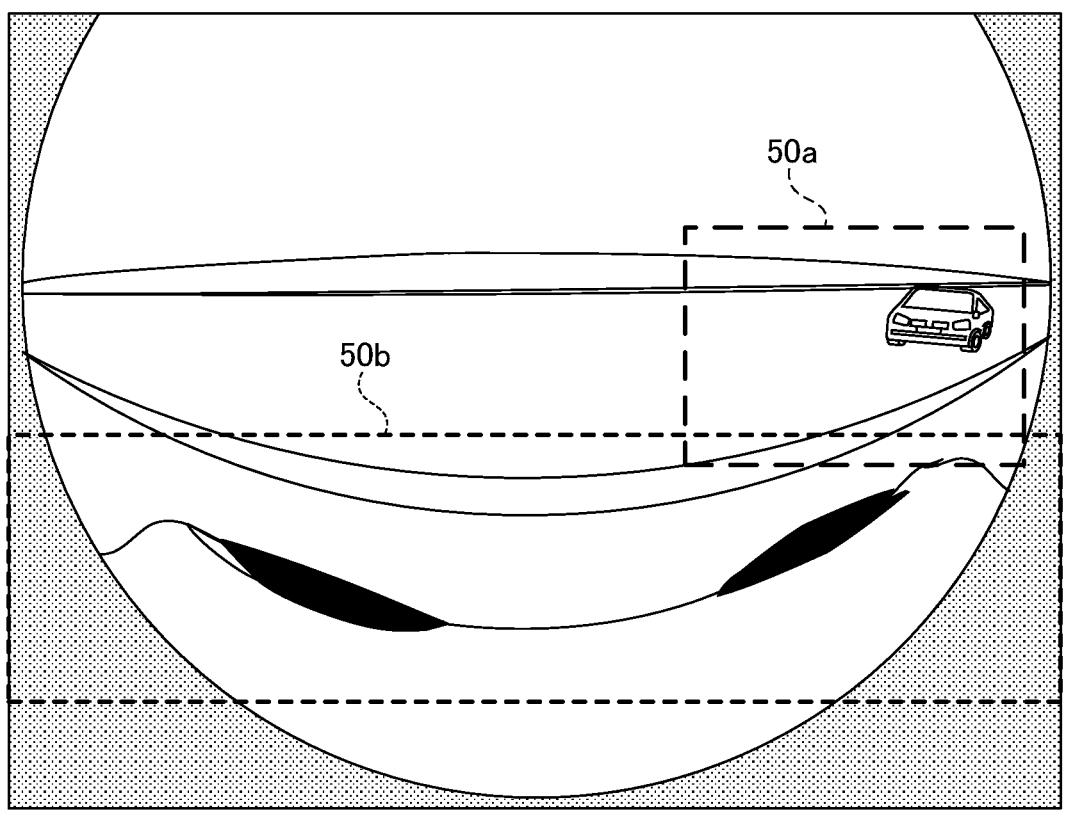
FIG. 5 is a diagram illustrating an example of video captured by an image capturing apparatus 10 that has been arranged on the right side surface according to the First Embodiment.

FIG. 5 is a diagram illustrating an example of video captured by an image capturing apparatus 10 arranged on the right-side surface according to the First Embodiment. The processing unit 13 processes this video to generate a video for the side rearward portion, which is output to an electronic side mirror, and a video for the tire peripheral portion, which is output to either an electronic side mirror or some other display apparatus.

50a is a video region that is cut out for display on the electronic side mirror serving as a side-rearward cutout region, and captures the side rearward of the own vehicle. 50b is a video region that is cut out for display as a tire peripheral cutout region, and shows the tire peripheral portion on the side of the own vehicle. Details with respect to each region will be described below.

Figure 6:
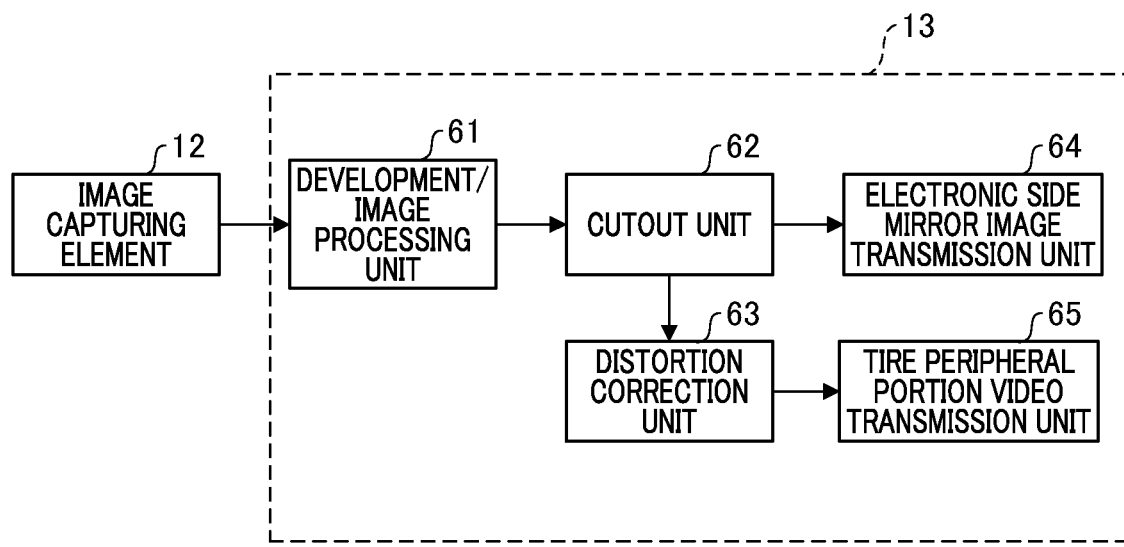
FIG. 6 is a functional block diagram showing a configuration example of a processing unit 13 according to the First Embodiment.

FIG. 6 is a functional block diagram showing a configuration example of the processing unit 13 according to the First Embodiment. Note that a portion of the functional blocks shown in FIG. 6 are realized by executing a computer program that has been stored on a memory (not shown) serving as a storage medium, by a CPU (not shown) serving as a computer that is included in the processing unit 13.

However, the processing unit 13 may also be made such that a portion or the entirety thereof is realized by using hardware. An application specific integrated circuit (ASIC), a processor (a reconfigurable processor, a DSP), or the like can be used as the hardware.

In addition, each of the functional blocks that are shown in FIG. 6 do not need to be stored in the same housing, and they may also be configured by separate devices that have been connected to each other via signal paths. It should be noted that the above-described explanation related to FIG. 6 similarly applies with respect to FIG. 10 and FIG. 14.

In FIG. 6, when the processing unit 13 receives a video signal from the image capturing element 12, various correction processes such as development processing, Wide Dynamic Range (WDR) correction, and gamma correction are first performed by a development/image processing unit 61. The cutout unit 52 then cuts out each of the side-rearward cutout region 50a and the tire peripheral cutout region 50b from the video that has been processed.

Because the side-rearward cutout region 50a has little distortion due to the optical characteristics of the optical system 11, a display without a sense of discomfort can be obtained when the side-rearward cutout region 50a is output to the electronic side mirror without distortion correction processing. The region that is cut out is preferably cut out from the high-resolution region 20b, but it is not limited thereto and may partially include the low-resolution region 20c that is less than a predetermined angle of view.

It should be noted that more preferably, the center of the side-rearward cutout region 50a is cut out so as to be included in the high-resolution region 20b. In addition, because the side-rearward cutout region 50a is an image capturing region that is displayed on an electronic side mirror, cutting out from a region that captures the rearward direction relative to the direction of travel is preferable. That is, in a case in which the image capturing apparatus 10 has been installed on the right side, for example, it is preferable to cut out the side-rearward cutout region 50a such that the center thereof is to the right of the center of the image capturing region, as viewed in FIG. 5.

It should be noted that because the electronic side mirror is a monitor that simulates a mirror, either the processing unit 13 or the electronic side mirror includes a process to perform horizontal reversal. In addition, although the video signal of the side-rearward cutout region 50a is transmitted to the electronic side mirror via an electronic side mirror video transmission unit 64, a correction unit (not shown) that performs distortion correction and the like may be provided between the cutout unit 52 and the electronic side mirror video transmission unit 64.

With respect to the tire peripheral cutout region 50b of FIG. 5, the range (region) that the cutout unit 52 cuts out may be such that it includes the periphery of the front and rear tires of the own vehicle. In addition, each region that the cutout unit 52 cuts out may be appropriately set according to the region in real space corresponding to the video that is displayed. That is, the user may perform setting of the range that is displayed and the region in real space.

In addition, the tire peripheral cutout region 50b that has been cut out is subjected to distortion correction processing in a distortion correction unit 63. Here, the distortion correction unit 63 functions as a distortion correction means to correct the distortion of the image obtained from at least the low-resolution region.

Thereafter, the video signal is transmitted to a display apparatus and the like for a side-view monitor, for example, via a tire peripheral portion video transmission unit 65. Alternatively, on the electronic side mirror that displays the side rearward video, it is also possible to overlay the video partially in a picture-in-picture format on, for example, the lower side of the screen. These display apparatuses function as a display unit for displaying by cutting out at least a part of an image of the lower side and the forward-rearward direction of the vehicle.

Figure 7:
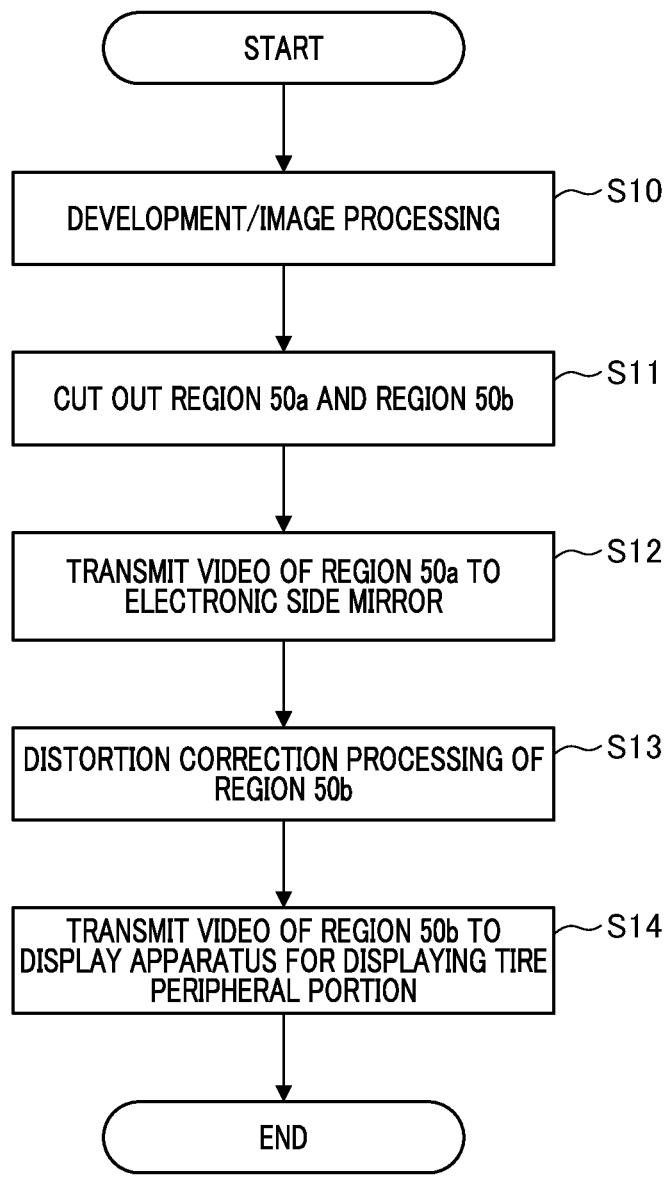
FIG. 7 is a flowchart explaining the processing flow of an image capturing method by an image capturing apparatus according to the First Embodiment.

FIG. 7 is a flowchart explaining the processing flow of an image capturing method by an image capturing apparatus according to the First Embodiment. It should be noted that the operations of each step of the flowchart of FIG. 7 are performed by a CPU or the like serving as a computer within the processing unit 13 executing a computer program that has been stored in a memory.

In step S10, the processing unit 13 performs image processing such as development processing and various corrections on the video signal received from the image capturing element 12. Next, in step S11, the processing unit 13 performs the process of cutting out the regions corresponding to the above-described side-rearward cutout region 50a and the tire peripheral cutout region 50b.

Next, in step S12, the electronic side mirror image transmission unit 64 transmits the video of the cut-out side rearward cutout region 50a to the electronic side mirror. Then, in step S13, distortion correction processing is applied to the video of the cut-out tire peripheral cutout region 50b. Thereafter, in step S14, the tire peripheral portion video transmission unit 65 transmits the video of the tire peripheral cutout region 50*b* after distortion correction processing to a display apparatus for displaying the tire peripheral portion.

In this manner, by installing an image capturing apparatus 10 such that it faces the side, it is possible to capture high-resolution video of the periphery of the vehicle and the peripheral portions of the tires with a small number of image capturing apparatuses. Furthermore, by capturing images in a high-resolution region 20*b* having a predetermined angle of view or greater, it is possible to obtain high-resolution and low-distortion video of the side-rearward and tire peripheral portions. It should be noted that, although tires are explained as an example of wheels in the First Embodiment, a wheel is not limited to a tire.

Second Embodiment

In the First Embodiment, arranging an image capturing apparatus 10 on the left and right-side surfaces of a vehicle so as to enable monitoring the periphery of the vehicle and the peripheral portions of the tires, as well as the processing thereof, was explained. In a Second Embodiment, an arrangement of an image capturing apparatus and processing so as to enable monitoring forward of and side rearward of the vehicle, as well as the peripheral portions of the tires, will be explained. Explanations with respect to the same points as those in the First Embodiment will be omitted or simplified.

Figure 8:
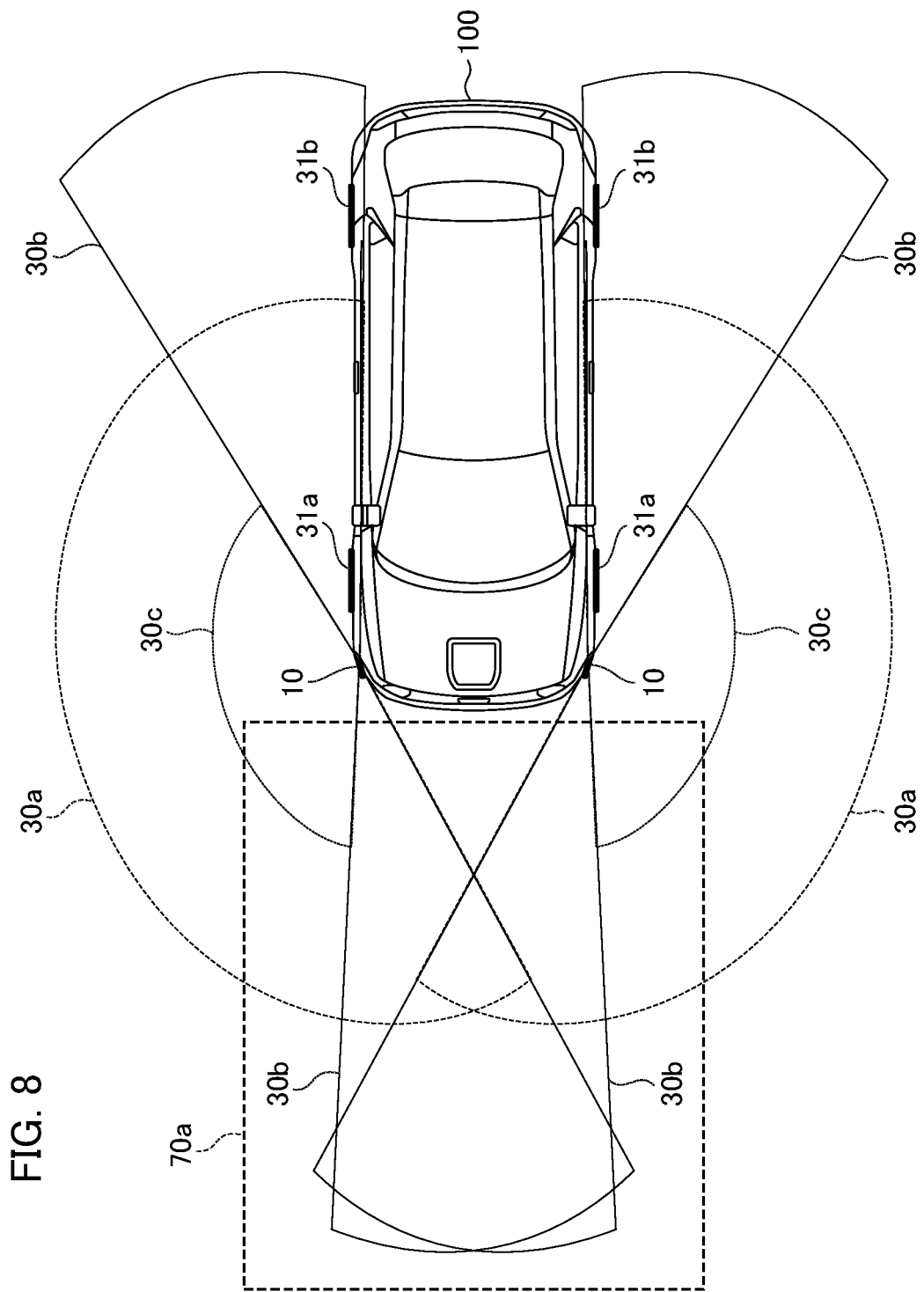
FIG. 8 is a diagram explaining a vehicle and an image capturing range of an image capturing apparatus according to a Second Embodiment.

The Second Embodiment of the present invention will be explained below with reference to FIG. 8. FIG. 8 is a diagram explaining a vehicle and an image capturing range of an image capturing apparatus according to the Second Embodiment, wherein the vehicle 100 is viewed from above in an overhead view.

As shown in FIG. 8, image capturing apparatuses 10 are installed on the right front side surface (periphery of the right front end) and on the left front side surface (periphery of the left front end) of the vehicle 100. That is, in the Second Embodiment, image capturing apparatuses 10 are each arranged on either side of the width direction of the front of the vehicle, thereby enabling monitoring forward of and side rearward of vehicle 100 serving as a vehicle, as well as the peripheral portions of the tires.

A total image capturing range 30*a* in FIG. 8 schematically shows the horizontal angle of view of an image capturing apparatus 10, and has a wider range than a total image capturing range 30*a* in the First Embodiment. In addition, the forward portion of the vehicle 100 has overlapping high-resolution image capturing ranges 30*b* by the left and right image capturing apparatuses 10, and the overlapping range is indicated as a forward overlapping range 70*a*.

In this manner, in the Second Embodiment, images of the forward-rearward direction of the vehicle within the high-resolution image capturing region 30*b*, which corresponds to the high-resolution region of the optical system, include images forward of the vehicle, and the high-resolution image capturing regions from a plurality of image capturing devices are arranged so as to overlap with each other. In addition, a high-resolution region includes a blind spot of the driver diagonally forward of the vehicle.

Figure 9:
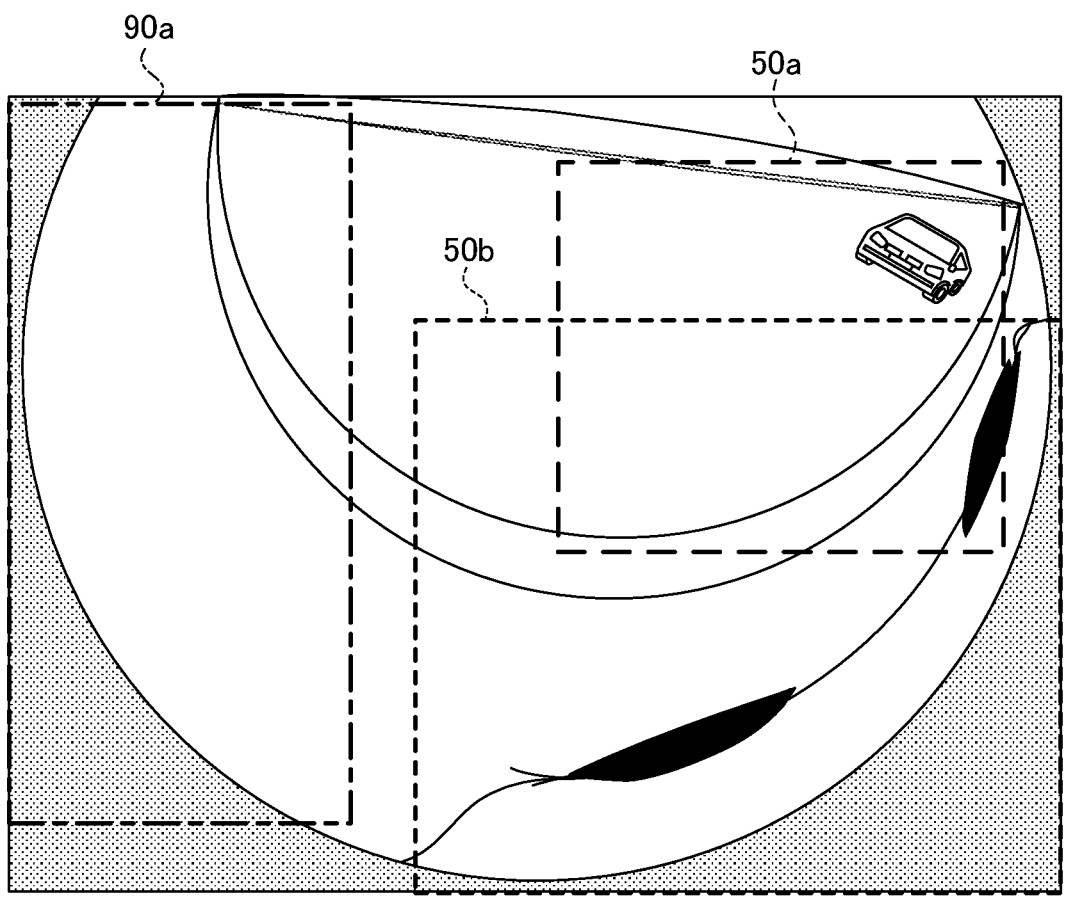
FIG. 9 is a diagram illustrating an example of video captured by an image capturing element 12 according to the Second Embodiment.

FIG. 9 is a diagram illustrating an example of video captured by the image capturing element 12 according to the Second Embodiment, and shows an example of the video captured by the image capturing element 12 when image capturing apparatuses 10 are arranged as in FIG. 8. FIG. 9 shows an example of video from the image capturing apparatus 10 arranged on the right front side surface. Although an image capturing apparatus 10 is also arranged at the periphery of the end portion of the left front side surface, an explanation thereof is omitted.

In the Second Embodiment, the processing unit 13 generates video for displaying the right side-rearward cutout region 50*a* on the electronic side mirror by processing video such as that as shown in FIG. 9. In addition, the tire peripheral cut-out region 50*b* of the tire peripheral portion is generated as video for displaying on a part of the electronic side mirror or other display apparatus.

Furthermore, in the Second Embodiment, video is generated for displaying forward of the vehicle 100 on a certain display device. It should be noted that a forward cutout region 90*a* is a region that is cut out for video showing forward of the vehicle, and details thereof will be described below.

Figure 10:
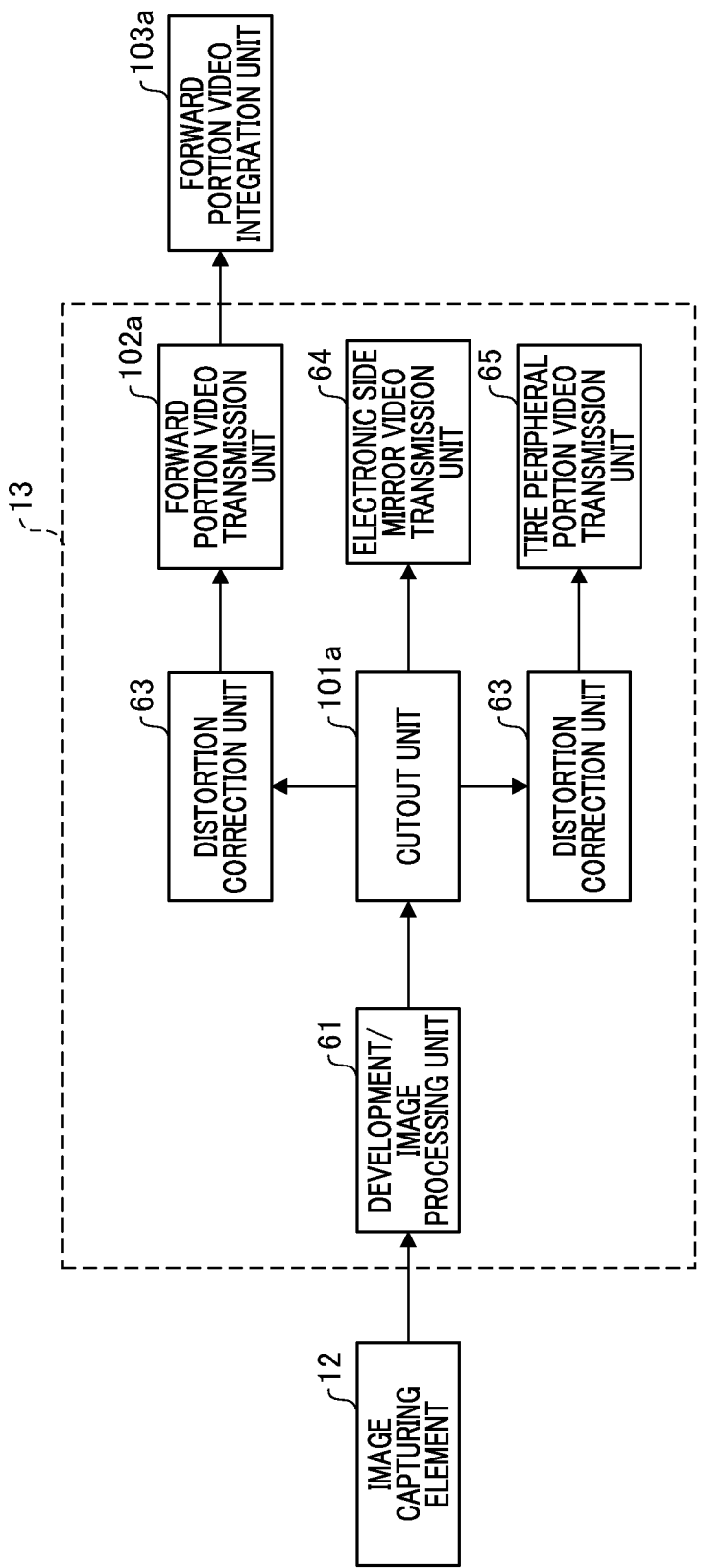
FIG. 10 is a functional block diagram showing a configuration example of the processing unit 13 according to the Second Embodiment.

FIG. 10 is a functional block diagram showing a configuration example of the processing unit 13 according to the Second Embodiment. In FIG. 10, when the processing unit 13 receives a video signal from the image capturing element 12, various correction processes such as development processing, WDR correction, and gamma correction are first performed by the development/image processing unit 61. In a cutout unit 101*a*, the side-rearward cutout region 50*a*, the tire peripheral cutout region 50*b*, and the forward cutout region 90*a* are cut out from the video that has been processed.

The video signal of the side-rearward cutout region 50*a* is transmitted to the electronic side mirror (not shown) via the electronic side mirror video transmission unit 64. It should be noted that a correction unit (not shown) that performs distortion correction and the like may be provided between the cutout unit 101*a* and the electronic side mirror video transmission unit 64.

The tire peripheral cut-out region 50*b* is subjected to distortion correction processing in the distortion correction unit 63. Thereafter, the video signal is displayed, for example, on a display apparatus for a side-view monitor or the like, via the tire peripheral portion video transmission unit 65. Alternatively, the electronic side mirror displaying the side rearward video may partially overlay the video in a picture-in-picture manner, for example, on the lower side of the screen.

The forward cutout region 90*a* is a region that is used for video showing forward of the vehicle 100, and the range (region) cut out by the cutout unit 101*a* may be cut out so as to include the front portion of the vehicle. That is, it suffices to cut out the portion corresponding to forward of the vehicle from within the high-resolution image capturing range 30*b* and the low-resolution image capturing range 30*c* that are captured by the image capturing apparatus 10.

At least, it may be sufficient to cut out the portion that overlaps with the image capturing apparatuses 10, which are arranged around the periphery of the front-end portions of the left and right sides of the vehicle 100, as shown in the forward overlapping range 70*a*. In addition, each region that the cutout unit 101*a* cuts out may be appropriately set according to the region in real space corresponding to the video showing forward of the vehicle. That is, the user may perform setting of the range for displaying forward of the vehicle and the region in real space.

In addition, the video of the forward cutout region 90*a* that has been cut out is subjected to distortion correction processing in the distortion correction unit 63, and is then transmitted to the forward portion video integration unit 103*a* via a forward portion video transmission unit 102*a*.

In the forward portion video integration unit 103*a*, processing is performed so as to integrate the two forward portion videos that have each been generated by the two image capturing apparatuses 10 that have been arranged around the periphery of the left and right front side surface edges of the vehicle 100. For the integration processing, alignment processing is performed on the videos of the two forward cutout regions 90a that have been cut out from each of the two image capturing apparatuses 10 so as to correct the positional misalignment between the videos.

Then, by combining the two videos after performing alignment processing, an integrated forward video is generated. In this manner, the forward portion video integration unit 103a functions as an integration unit that integrates images from overlapping high-resolution image capturing ranges.

It should be noted that the output of the forward portion video integration unit 103a is supplied to, for example, a display apparatus that has been arranged on the instrument panel of the vehicle 100 or to another information processing apparatus for displaying the integrated forward video.

Figure 11:
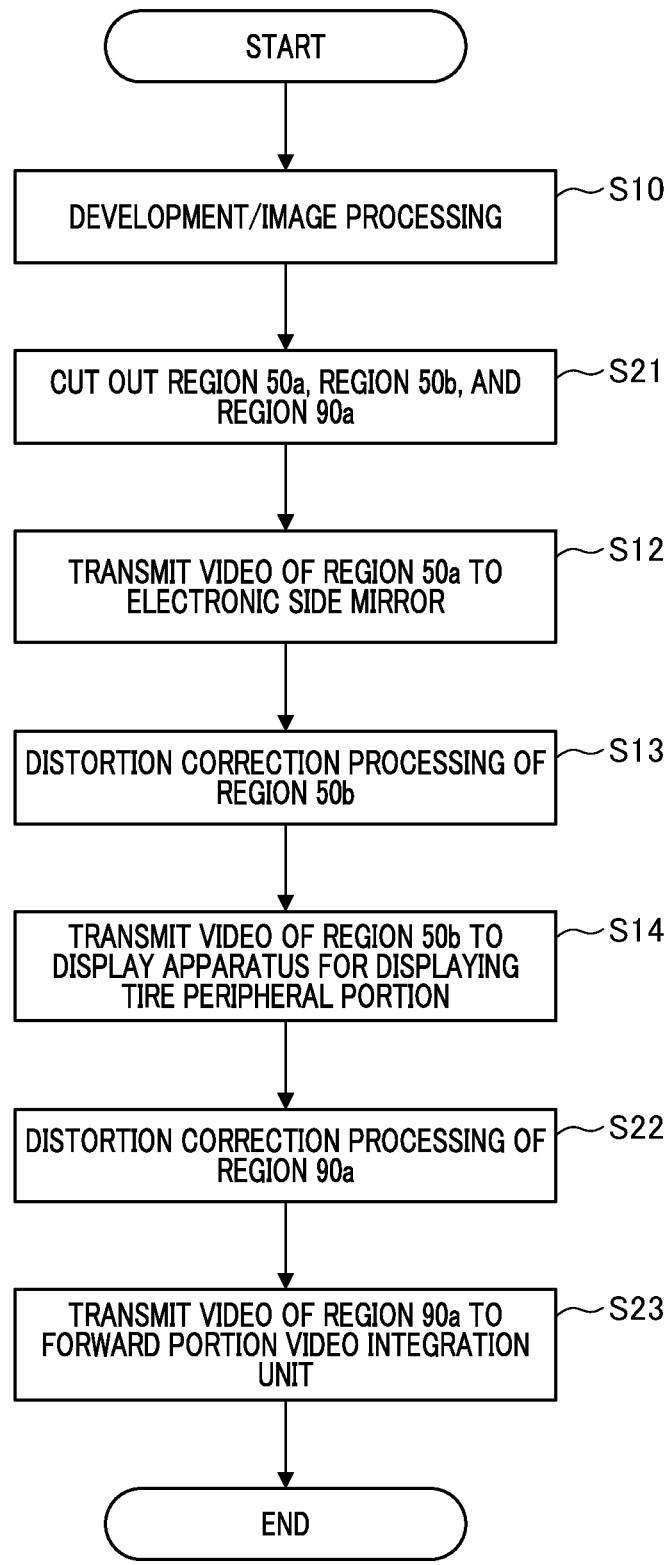
FIG. 11 is a flowchart explaining the processing flow of an image capturing method by an image capturing apparatus according to the Second Embodiment.

FIG. 11 is a flowchart explaining the processing flow of an image capturing method by an image capturing apparatus according to the Second Embodiment, and explains the processing flow when performing forward monitoring. It should be noted that the operations of each step of the flowchart of FIG. 11 are performed by a CPU or the like serving as a computer within the processing unit 13 executing a computer program that has been stored in a memory.

In step S10, the processing unit 13 performs image processing such as image development processing and various corrections on the video signal received from the image capturing element 12. Next, in step S21, the processing unit 13 performs the process of cutting out the regions corresponding to the above-described side-rearward cutout region 50a, the tire peripheral cutout region 50b, and the forward cutout region 90a.

Next, in step S12, the electronic side mirror image transmission unit 64 transmits the video of the cut-out side-rearward cutout region 50a to the electronic side mirror. Then, in step S13, distortion correction processing is applied to the video of the cutout tire peripheral cutout region 50b. Thereafter, in step S14, the tire peripheral portion video transmission unit 65 transmits the video of the tire peripheral cutout region 50b after distortion correction processing to a display apparatus for displaying the tire peripheral portion.

Next, in step S22, distortion correction processing is applied to the video of the cutout forward cutout region 90a. Then, in step S23, the forward portion video transmission unit 102a transmits the forward portion video of the forward cutout region 90a, which has been subjected to distortion correction processing, to the forward portion video integration unit 103a, and the forward portion video undergoes alignment processing and is subsequently integrated.

As previously described, the integrated forward portion video is supplied, for example, to a display apparatus that has been arranged on the instrument panel of the vehicle 100 or to another information processing apparatus for displaying the integrated forward video.

As described above, by arranging the two image capturing apparatuses 10 around the front end periphery of the left and right side surfaces of the vehicle, it is possible to capture high-resolution video of the periphery of the vehicle, particularly side rearward and forward of the vehicle, and the peripheral portions of the tires, with a small number of image capturing apparatuses. Furthermore, by capturing images in a high-resolution region 20b having a predetermined angle of view or greater, it is possible to obtain high-resolution and low-distortion video of the side rearward and tire peripheral portions.

Third Embodiment

In a Third Embodiment, the arrangement of an image capturing apparatus and processing suitable for monitoring rearward and the peripheral portions of the tires will be explained. Explanations with respect to the same points as those in the First Embodiment and Second Embodiment will be omitted or simplified.

Figure 12:
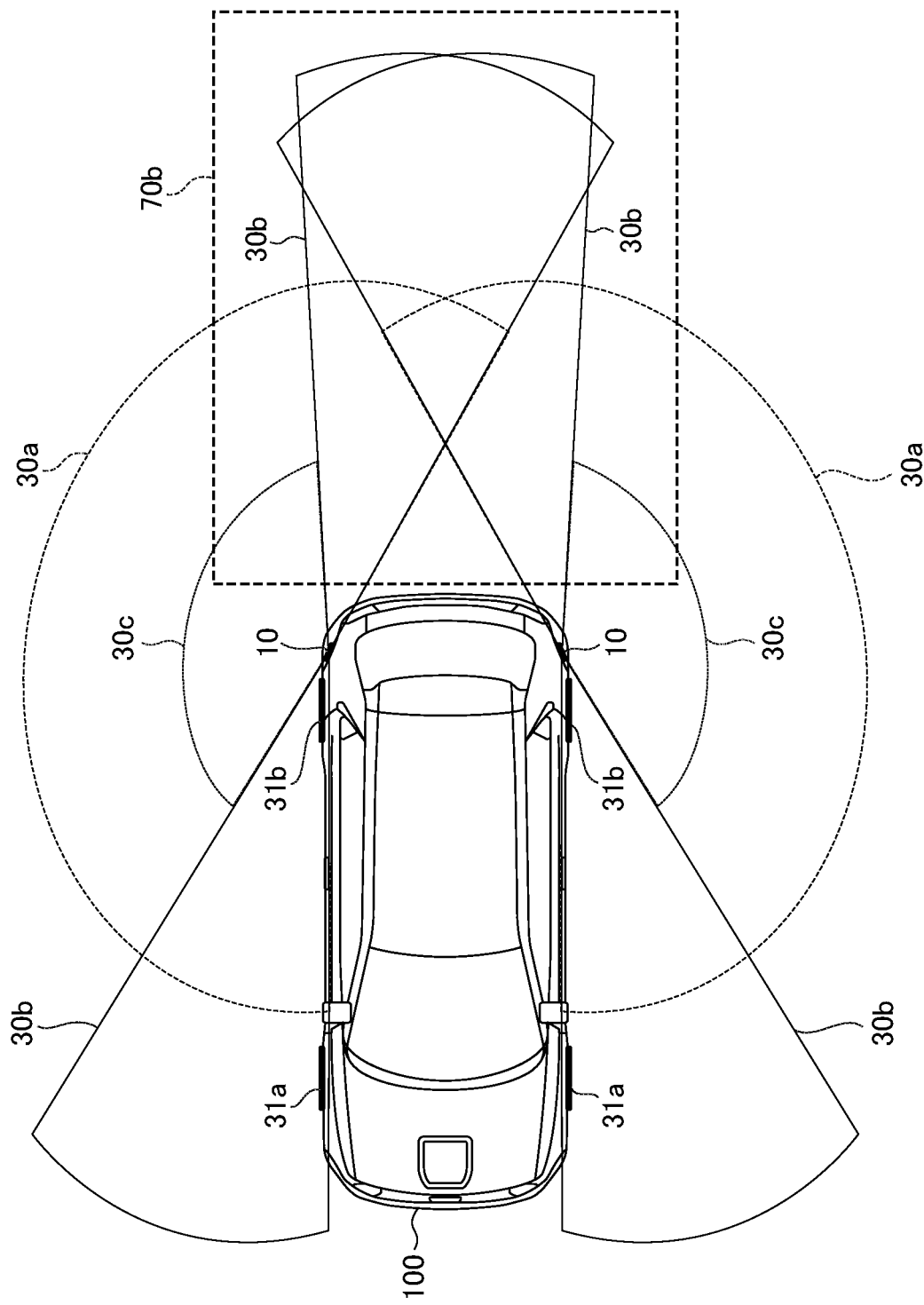
FIG. 12 is a diagram explaining a vehicle and an image capturing range of an image capturing apparatus according to a Third Embodiment.

The Third Embodiment of the present invention will be explained below with reference to FIG. 12. FIG. 12 is a diagram explaining a vehicle and an image capturing range of an image capturing apparatus according to a Third Embodiment, and shows the state of the vehicle 100 as viewed from above in an overhead view.

In FIG. 12, an arrangement example suitable for monitoring rearward and the peripheral portions of the tires of the vehicle 100 is shown. In the Third Embodiment, as shown in FIG. 12, image capturing apparatuses 10 are installed on the right rear side surface (periphery of the right rear end) and the left rear surface side (periphery of the left rear end) of the vehicle 100. That is, in the Third Embodiment, image capturing apparatuses 10 are each arranged on each side of the width direction of the rear of the vehicle, thereby making it possible to monitor rearward and side rearward of the vehicle 100 serving as a vehicle, as well as the peripheral portions of the tires.

It should be noted that in FIG. 12, the total image capturing range 30a schematically shows the horizontal angle of view of the image capturing apparatus 10. The rearward portion of the vehicle has overlapping high-resolution image capturing ranges 30b by the left and right image capturing apparatuses 10, and the overlapping range is indicated as a rearward overlapping range 70b.

In this manner, in the Third Embodiment, images of the forward-rearward direction of the vehicle in a high-resolution image capturing range 30b corresponding to the high-resolution region of the optical system include images rearward of the vehicle, and are arranged so as to overlap with each other in the high-resolution ranges of a plurality of image capturing apparatuses.

Figure 13:
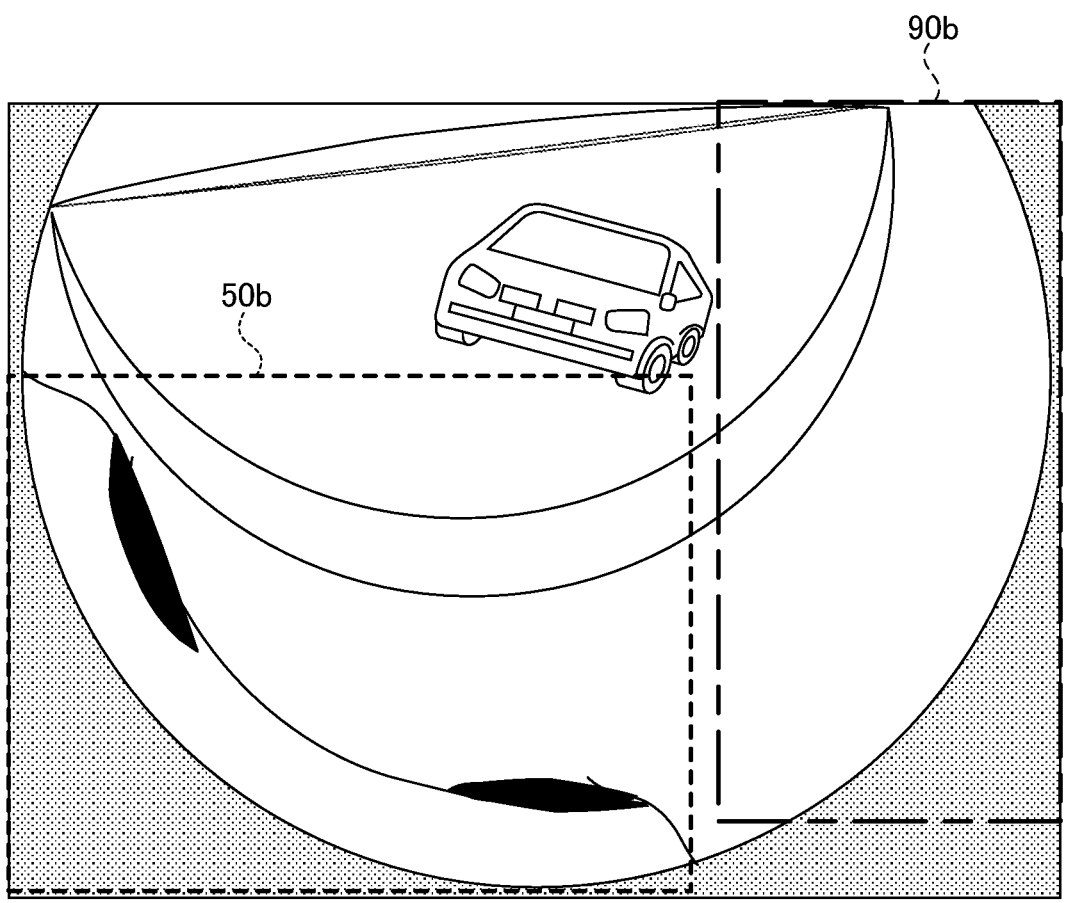
FIG. 13 is a diagram illustrating an example of video captured by the image capturing element 12 according to the Third Embodiment.

FIG. 13 is a diagram illustrating an example of video captured by the image capturing element 12 according to the Third Embodiment. FIG. 13 shows a video obtained from an image capturing apparatus arranged at the rear end of the right-side surface. Although an image capturing apparatus 10 is also arranged at the periphery of the end portion on the left rear side surface, an explanation thereof is omitted.

In the Third Embodiment, the processing unit 13 generates video for displaying the tire peripheral cutout region 50b on a part of the electronic side mirror or other display apparatus by processing video such as that of FIG. 13.

Furthermore, in the Third Embodiment, video for displaying rearward of the vehicle 100 on some display apparatus is generated. It should be noted that a rearward cutout region 90b is a region that is cut out for the video displaying rearward of the vehicle, and details thereof will be described below.

Figure 14:
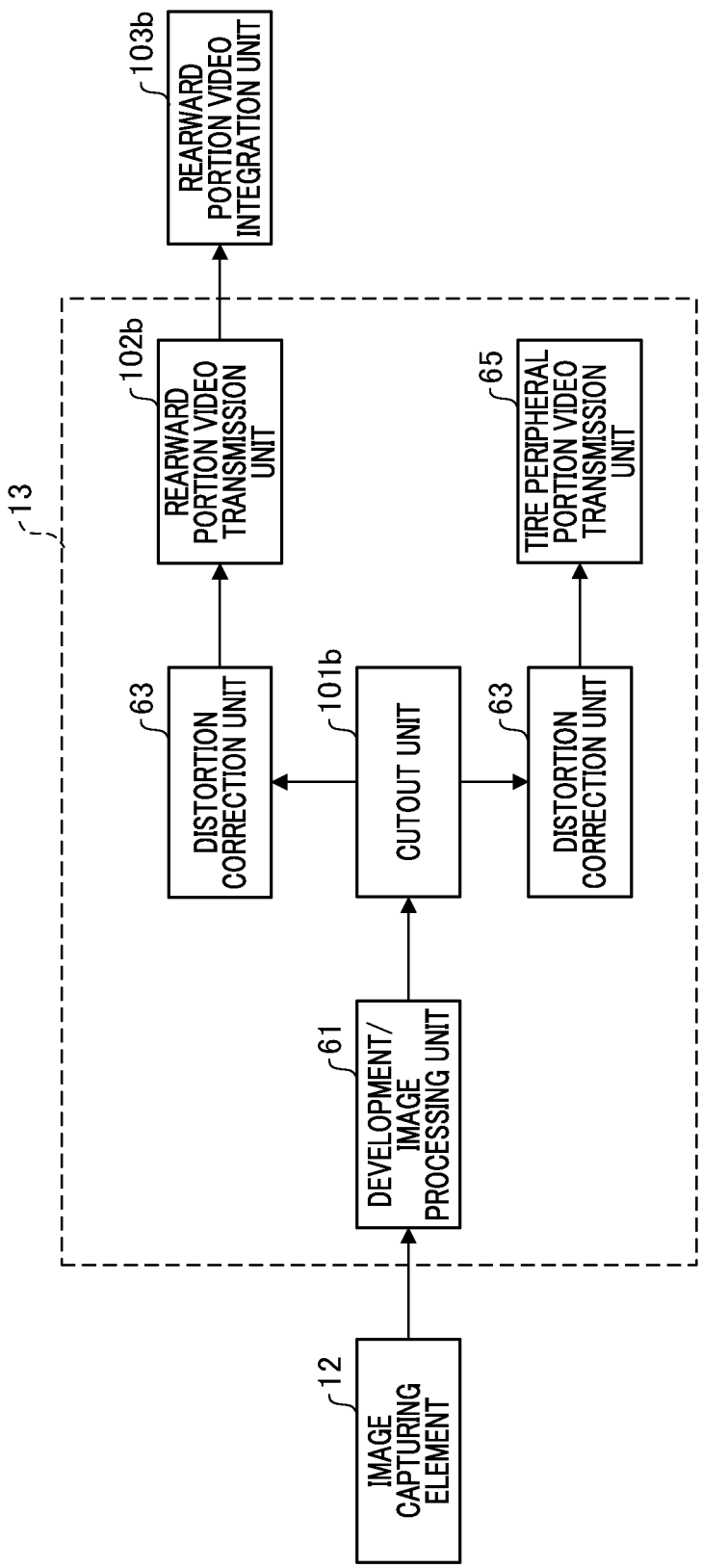
FIG. 14 is a functional block diagram showing an example configuration of the processing unit 13 according to the Third Embodiment.

FIG. 14 is a functional block diagram showing an example configuration of the processing unit 13 according to the Third Embodiment, and in FIG. 14, when the processing unit 13 receives a video signal from the image capturing element 12, various correction processes such as development processing, WDR correction, and gamma correction are first performed by the development/image processing unit 61.

In a cutout unit 101b, the tire peripheral cutout region 50b and the rearward cutout region 90b are cut out from the video that has been processed. The video signal of the tire peripheral cutout region 50b is subjected to distortion correction processing in the distortion correction unit 63, and is then displayed on, for example, a display device for a side-view monitor or the like via a tire peripheral portion video transmission unit 65. Alternatively, the electronic side mirror displaying the side rearward video may partially overlay the video in a picture-in-picture manner, for example, on the lower side of the screen.

The rearward cutout region 90b is a region that is used for video that displays rearward of the vehicle 100, and the range (region) cut out by the cutout unit 101b may be cut out so as to include the rearward portion of the vehicle. That is, the portion corresponding to rearward of the vehicle may be cut out from either a high-resolution image capturing range 30b or a low-resolution image capturing range 30c that are captured by an image capturing apparatus 10.

At least a portion that overlaps with the image capturing apparatuses 10, which are arranged around the periphery of the rear end portions of the left and right-side surfaces of the vehicle 100 as shown in the rearward overlapping range 70b, may be cut out. In addition, each region that the cutout unit 101b cuts out may be appropriately set according to the region in real space corresponding to the video displaying rearward of the vehicle. That is, the user may perform setting of the range for displaying rearward of the vehicle and the region in real space.

In addition, the video of the rearward cut-out region 90b that has been cut out is subjected to distortion correction processing in the distortion correction unit 63, and is then transmitted to a rearward portion video integration unit 103b via a rearward portion video transmission unit 102b.

In the rearward portion video integration unit 103b, processing is performed so as to integrate the two rearward portion videos that have each been generated by the two image capturing apparatuses 10 that have been arranged around the left and right rear side surface edges of the vehicle 100. For the integration processing, alignment processing is performed on the videos of the two rearward cutout regions 90b that have been cut out from the two image capturing apparatuses 10 so as to correct the positional misalignment between the videos.

By combining the two videos after performing alignment processing, an integrated rearward video is generated. In this manner, the rearward portion video integration unit 103b functions as an integration unit that integrates images from overlapping high-resolution image capturing ranges in the rearward region.

It should be noted that the output of the rearward portion video integration unit 103b is displayed by being supplied to, for example, a display apparatus that has been arranged on the instrument panel of the vehicle 100, a rearview mirror monitor, or other information processing apparatus, for displaying the integrated rearward video.

Figure 15:
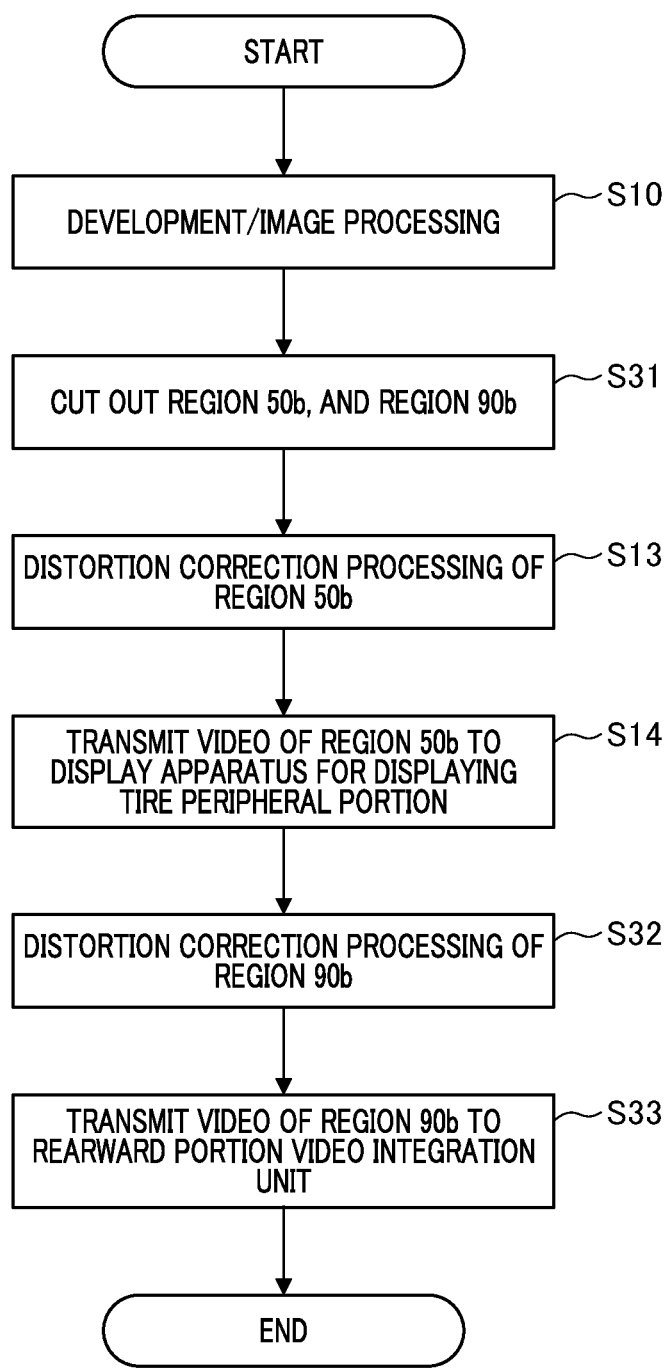
FIG. 15 is a flowchart illustrating the processing flow of an image capturing method by an image capturing apparatus according to the Third Embodiment.

FIG. 15 is a flowchart explaining the processing flow of an image capturing method by an image capturing apparatus according to the Third Embodiment, and explains the processing flow when performing rear monitoring. It should be noted that the operations of each step of the flowchart of FIG. 15 are performed by a CPU or the like serving as a computer within the processing unit 13 executing a computer program that has been stored in a memory.

In step S10, the processing unit 13 performs image processing such as development processing and various corrections on the video signal received from the image capturing element 12. Next, in step S31, the processing unit 13 performs the process of cutting out the regions corresponding to the above-described tire peripheral cutout region 50b and the rearward cutout region 90b.

Then, in step S13, distortion correction processing is applied to the video of the cutout tire peripheral cutout region 50b. Thereafter, in step S14, the tire peripheral portion video transmission unit 65 transmits the video of the tire peripheral cutout region 50b after distortion correction processing to a display apparatus for displaying the tire peripheral portion.

Next, in step S32, distortion correction processing is applied to the video of the rearward cutout region 90b that was cut out. Then, in step S33, the rearward portion video transmission unit 102b transmits the rearward portion video of the rearward cutout region 90b, which has been subjected to distortion correction processing, to the rearward portion video integration unit 103b, where it is integrated after alignment processing has been performed.

As described above, the integrated rearward portion video is displayed by being supplied to, for example, a display apparatus that has been arranged on the instrument panel of the vehicle 100, a rearview mirror monitor, or other information processing apparatus, for displaying the integrated rearward video.

As explained above, by arranging two image capturing apparatuses 10 around the periphery of the rear end portions of the left and right-side surfaces of the vehicle, it is possible to capture high-resolution video of the periphery of the vehicle, particularly rearward of the vehicle and the peripheral portions of the tires, with a small number of image capturing apparatuses. Furthermore, by capturing images with a predetermined angle of view or greater in the high-resolution region 20b, it is possible to obtain video rearward of the vehicle and of the tire peripheral portions that is high-resolution and low in distortion.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image capturing apparatus through a network or various storage media. Then, a computer (or a CPU, an MPU, or the like) of the image capturing apparatus may be configured to read and execute the program. In such a case, the program and the storage medium storing the program configure the present invention.

Furthermore, the present invention includes implementations that use at least one processor or circuit configured to perform the functions of the embodiments explained above. It should be noted that distributed processing may be performed by using a plurality of processors.

This application claims the benefit of Japanese Patent Application No. 2022-211106, filed on Dec. 28, 2022, which is hereby incorporated by reference herein in its entirety.

What is claimed is:

1. An image capturing apparatus comprising an image capturing unit configured to include an optical system that forms a low-resolution region on a central side of a light-receiving surface, and that forms a high-resolution region on a peripheral side of the light-receiving surface, wherein the image capturing unit is arranged on a vehicle so that an image of a lower side and forward-rearward direction of the vehicle is formed in the high-resolution region of the light-receiving surface of the image capturing unit by the optical system, wherein when a focal distance of the optical system is f, a half-angle of view is θ, an image height on an image plane is y, a projection characteristic representing the relationship between the image height y and the half-angle θ is y(θ), and θmax is the maximum half-angle of view of the optical system, the image capturing apparatus is configured to satisfy the following equation:

$$0.2 < 2 \times f \times \tan(\theta max/2)/y(\theta max) < 0.92.$$

2. The image capturing apparatus according to claim 1, wherein the image of the forward-rearward direction of the vehicle includes an image forward of the vehicle.

3. The image capturing apparatus according to claim 1, wherein the image of the forward-rearward direction of the vehicle includes an image rearward of the vehicle.

4. The image capturing apparatus according to claim 1, wherein the high-resolution region includes a blind spot of a driver diagonally forward of the vehicle.

5. The image capturing apparatus according to claim 1, wherein the vehicle includes a front wheel and a wheel, and wherein the optical system is arranged such that an image of the front wheel and the rear wheel, and road surface is formed in the high-resolution region.

6. A vehicle comprising an image capturing unit configured to include an optical system that forms a low-resolution region on a central side of a light-receiving surface and that forms a high-resolution region on a peripheral side of the light-receiving surface, wherein the image capturing unit is arranged on a side of the vehicle so that an image of a lower side and forward-rearward direction of the vehicle is formed in the high-resolution region of the light-receiving surface of the image capturing unit by the optical system, wherein when a focal distance of the optical system is f, a half-angle of view is θ, an image height on an image plane is y, a projection characteristic representing the relationship between the image height y and the half-angle θ is y(θ), and θmax is the maximum half-angle of view of the optical system, the image capturing apparatus is configured to satisfy the following equation:

$$0.2 < 2 \times f \times \tan(\theta max/2)/y(\theta max) < 0.92.$$

7. The vehicle according to claim 6, wherein the image capturing unit is arranged on each side of a width direction of the front or rear of the vehicle so that an image of a lower side and forward-rearward direction of a vehicle is formed in the high-resolution region of the light-receiving surface of the image capturing unit by the optical system.

8. The vehicle according to claim 7, wherein the high-resolution image capturing ranges of image capturing apparatuses that are each arranged on either side of the width direction of the front or rear of the vehicle are arranged so as to overlap with each other.

9. The vehicle according to claim 8, comprising at least one processor or circuit configured to function as an integration unit that integrates images of regions in which the image capturing ranges of the high-resolution regions overlap with each other.

10. The vehicle according to claim 6, comprising a display unit for displaying by cutting out at least a part of an image of the lower side and the forward-rearward direction of the vehicle.

11. The vehicle according to claim 6, further comprising at least one processor or circuit configured to function as a distortion correction unit configured to correct distortion in at least an image obtained from the low-resolution region.

* * * * *